United States Patent [19]

Nelson

[11] 4,160,278

[45] Jul. 3, 1979

[54] FINE TUNING INDICATOR FOR TV WITH SYNCHRONOUS DETECTOR

[75] Inventor: Ronald C. Nelson, Forest Park, Ill.

[73] Assignee: Zenith Radio Corporation, Glenview, Ill.

[21] Appl. No.: 859,420

[22] Filed: Dec. 12, 1977

[51] Int. Cl.² .............................................. H04N 5/50
[52] U.S. Cl. ................................................ 358/192
[58] Field of Search ......................... 358/192; 325/455

Primary Examiner—Robert L. Richardson
Attorney, Agent, or Firm—Nicholas A. Camasto

[57] ABSTRACT

A fine tuning indicator for a television receiver uses a synchronous detector for generating a control voltage indicative of the tuning accuracy. The control voltage is sensed by an indicating circuit which produces a visual indication of the tuned or mistuned condition of the receiver.

8 Claims, 1 Drawing Figure

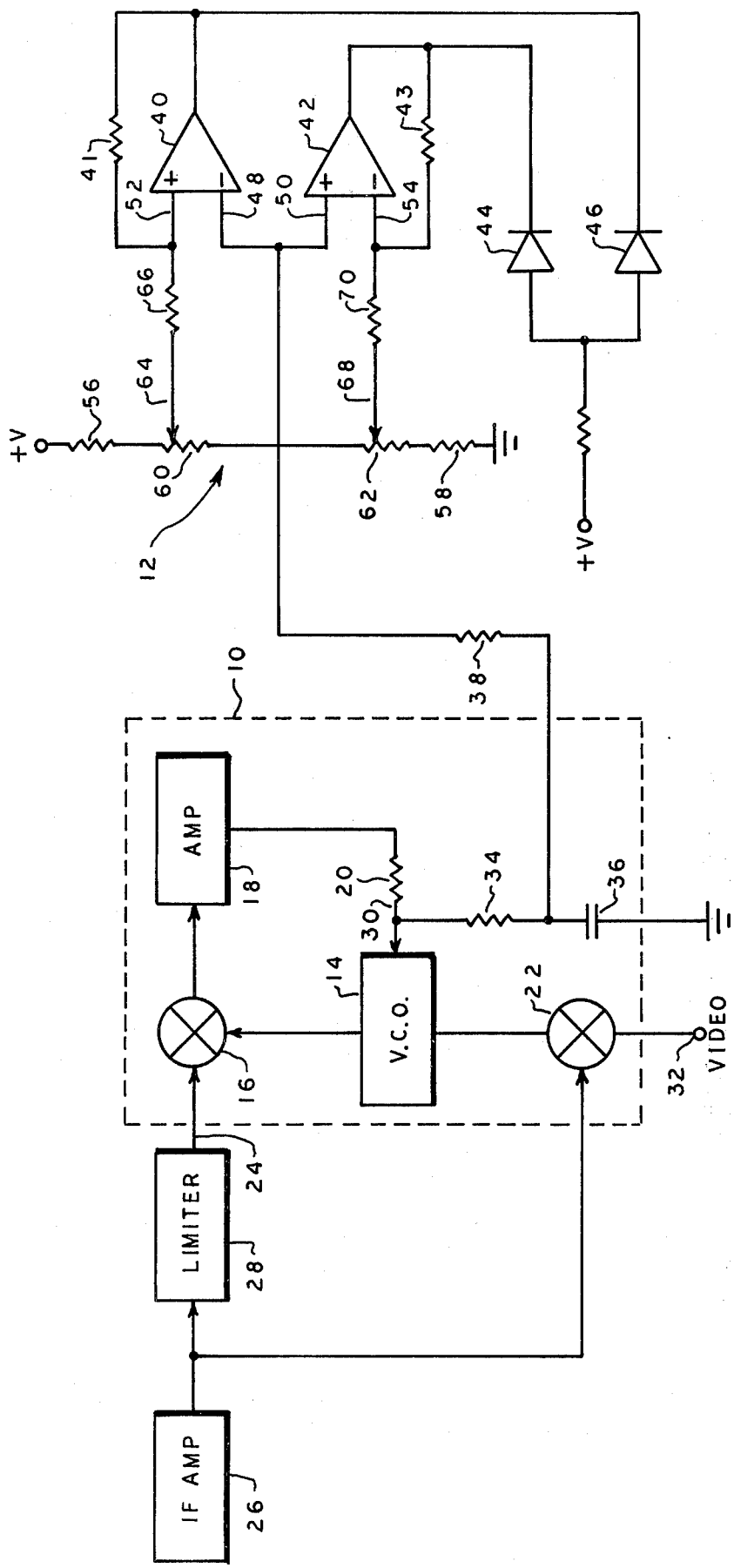

FINE TUNING INDICATOR FOR TV WITH SYNCHRONOUS DETECTOR

BACKGROUND OF THE INVENTION

This invention relates generally to television receivers and particularly to fine tuning indicators for use with television receivers.

Television receivers generally provide a fine tuning control to permit a viewer to accurately tune the receiver to a selected television channel. However, most viewers are not able to determine precisely when the receiver is accurately tuned. Consequently, the television receiver may be inaccurately tuned and, as a result, not produce an optimum picture.

In the highly competitive television market, performance, reliability and cost are all of major concern. In this respect, adequate performing fine tuning indicators are generally cumbersome and expensive. Even though most "full feature" receivers include a form of automatic frequency control (AFC) for maintaining the tuner locked to the received signal, it is desirable to optimize receiver tuning prior to AFC activation. Consequently there is a need for fine tuning indicators to help the average viewer tune his receiver, at least initially before releasing the tuning system to AFC.

In video detection systems, the simple envelope detector has long been the most popular and have proven quite satisfactory. Recently however there has been a trend toward synchronous detectors, which offer enhanced performance.

The present invention offers attractive advantages with a receiver using a synchronous detector in that it uses the control voltage generated by the synchronous detector locking loop to control a fine tuning indicator, thus providing a reliable tuning indicator at a low cost.

OBJECTS OF THE INVENTION

Accordingly, it is a general object of the invention to provide an improved television receiver tuning indicator.

It is a more specific object of the invention to provide an accurate fine tuning indicator for a synchronous detector type television receiver.

SUMMARY OF THE INVENTION

The fine tuning indicator described herein utilizes the existing television synchronous detector for generating a control voltage of predetermined value when the receiver is properly tuned and for varying the value of the control voltage in accordance with the degree of mistuning of the receiver. The control voltage is sensed by an indicating circuit which produces a visual indication of the tuned or mistuned condition of the receiver.

BRIEF DESCRIPTION OF THE DRAWINGS

The above and other objects of the invention are more particularly set forth in the following detailed description and in the accompanying drawing which illustrates a preferred embodiment of a fine tuning indicator constructed in accordance with the invention.

DESCRIPTION OF THE PREFERRED EMBODIMENT

It is conventional to convert the received high frequency television signal to a lower frequency called the intermediate frequency (IF) signal. The IF frequency is generally 45.75 megahertz. After suitable amplification, the IF signal is demodulated to obtain the video and synchronizing components.

Most television receivers employ peak detectors for demodulating the IF signal. More advanced receivers incorporate a synchronous detector because it produces a demodulated signal of lower distortion. Such a synchronous detector includes a conventional APC (automatic phase control) loop which generates an error signal or control voltage for locking the frequency of the detector oscillator to the frequency of the IF signal. The detector oscillator and the IF signal are then fed to a multiplier whose output is a low distortion demodulated video signal. There are also so-called quasi-synchronous detectors which do not incorporate an APC loop. It should be remembered that for this invention only conventional synchronous detectors are of interest, that is, those which have a phase lock loop circuit.

It has been found that the control voltage developed by the synchronous detector can be advantageously used as an indicator of receiver tuning accuracy and in television receivers employing such synchronous detectors they may be used for driving a fine tuning indicator. Hence, the synchronous detector may be made to do double duty, namely, demodulate the IF signal and provide a control voltage for use as an indication of the accuracy of receiver tuning.

Referring now to the FIGURE, there is shown an exemplary embodiment of a fine turning indicator which employs a single synchronous detector 10 both for video demodulation and for providing a control voltage indicative of the accuracy of tuning of the receiver. An indicating circuit 12 responds to the synchronous detector control voltage and produces a visual indication of the accuracy of receiver tuning.

Referring more specifically to synchronous detector 10, it includes a voltage controlled detector oscillator 14, a first multiplier 16, an amplifier 18 (optional), a resistor 20, a second multiplier 22 and a series connection of a resistor 34 and a capacitor 36. Resistor 20, resistor 34 and capacitor 36 form a low pass filter network. Lead 24 supplies a conventional IF signal from an IF amplifier 26 and a limiter 28 to the input of the synchronous detector. The receiver circuitry preceding IF amplifier 26 is a conventional tuner and is, therefore, not shown.

The operation of synchronous detectors is well known. Suffice it to say that the various elements of detector 10 cooperate to lock the frequency of detector oscillator 14 to the frequency of the IF signal on lead 24. To control the oscillator frequency a control voltage is generated on a lead 30 which is at the junction of resistors 20 and 34. This control voltage is DC when lock has been achieved and, in the illustrated embodiment, has a predetermined magnitude when the IF signal is at its nominal frequency of 45.75 megahertz. Only when the receiver is properly tuned will the frequency of the IF signal be equal to 45.75 megahertz. Detuning of the receiver results in the frequency of the IF signal being either above or below nominal, depending on the direction of mistuning.

When the frequency of the IF signal deviates from nominal, the value of the control voltage on lead 30 deviates in a substantially linear manner. For example, when the IF frequency is above 45.75 megahertz, the control voltage is lower than the predetermined value. Similarly, when the IF frequency is low, the control voltage is higher than the predetermined value. Thus the control voltage on lead 30 is representative of the accuracy of receiver tuning.

To demodulate the IF signal, an output of oscillator 14 and the signal from IF amplifier 26 are fed to multiplier 22. At the output 32 of multiplier 22, demodulated video appears and is treated by conventional television circuitry (not shown) for creating a television picture.

The filtered control voltage at lead 30 is fed, via a resistor 38, to a pair of comparators 40 and 42. In general, comparators 40 and 42 compare the value of the control voltage with a pair of reference voltages which are, respectively, above and below the nominal or predetermined value. if the control voltage sensed by comparators 40 and 42 is outside the range of the reference voltages, one of a pair of visual indicators, in the form of light-emitting diodes 44 and 46, is energized to present a visual indication of the mistuning of the receiver.

More specifically, the comparison of the control voltage to the reference voltages is effected by coupling the control voltage to the negative input 48 of comparator 40 and to the positive input 50 of comparator 42, and by coupling one reference voltage to the positive input 52 of comparator 40 and the other reference voltage to the negative input 54 of comparator 42. Comparators 40 and 42 may include respective feedback resistors 41 and 43.

The voltages appearing at inputs 52 and 54 are developed by a voltage divider comprising fixed resistors 56 and 58 and a pair of variable resistors 60 and 62. The series combination of resistors 56, 58, 60 and 62 is coupled, as shown, between ground and a source of positive potention +V. A wiper arm 64, associated with variable resistor 60, picks off the desired reference voltage from resistor 60 and applies it to positive input terminal 52 of comparator 50 via a resistor 66. Wiper arm 68, associated with resistor 62, picks off the other reference voltage and applies it to negative input terminal 54 of comparator 42 via a resistor 70. Preferably, wiper arms 64 and 68 are adjusted such that the reference voltages appearing at input leads 52 and 54 of the comparators 40 are above and below, respectively, the nominal or predetermined value of the control voltage. Thus a voltage range is formed within which the control voltage may vary without developing an indication of mistuning. For example, if the predetermined or nominal value of the control voltage is 5.8 volts, the reference voltage appearing at input 52 of comparator 40 may be 6.8 volts and the reference voltage appearing at input 54 of comparator 42 may be 4.8 volts. Accordingly, a tuning range is provided within which the control voltage may vary without generating an indication of mistuning. However, should the receiver be detuned such that the control voltage exceeds the level of voltage on input 52 of comparator 40, comparator 40 will develop an output for actuating light-emitting diode 46, thereby giving a visual indication of both the fact and direction of receiver mistuning. Should the receiver be mistuned in the opposite direction, the value of the control voltage at input 50 of comparator 42 will be less than the value of the reference voltage on input 54 and comparators 42 will develop an output for activating light-emitting diode 44.

It will be appreciated that when the receiver is properly tuned (within a predetermined tuning range) the value of the control voltage will be within the range of the reference voltages at inputs 52 and 54 of the comparators and neither of light-emitting diodes 44 or 46 will be activated. Thus, comparators 40 and 42 generate a first or non-actuating signal when the control voltage has a value between the reference voltages and a second or actuating signal when the control voltage is outside the reference voltages.

In some instances, synchronous detector 10 may require calibration in order to insure that the control voltage appearing at lead 30 is of a known or predetermined value when the receiver is properly tuned. Such calibration may be effected by applying a signal of precisely 45.75 megahertz to the synchronous detector at lead 24. With the synchronous detector now receiving a signal whose frequency is equal to the frequency of the IF signal when the receiver is properly tuned, oscillator 14 may be adjusted to develop at lead 30 a control voltage whose value is precisely equal to its predetermined or nominal value. In the example used, oscillator 14 may be adjusted to develop a control voltage at lead 30 of 5.8 volts.

The method of adjustment of oscillator 14 will vary according to its specific construction. However, where oscillator 14 includes an adjustable coil, the coil itself may be adjusted to achieve the desired level of control voltage on lead 30.

Because the value of control voltage on lead 30 generally varies in a known manner according to the deviation in frequency of the IF signal, the extent of its variation may be measured or calculated such that the reference voltages appearing at inputs 52 and 54 of comparators 40 and 42 may be set to correspond to known frequency deviations. For example, if the IF tuning limit for the receiver is ±150 kilohertz, the reference voltages appearing at inputs 52 and 54 of comparators 40 and 42 may be set to the values which the control voltage assumes with these IF frequency deviations. Within the ±150 kilohertz limits, neither of the light-emitting diodes will be activated. Should the IF frequency deviate by more than 150 kilohertz from nominal, one of diodes 44 or 46 will be activated to present to a viewer a visual indication of the mistuned condition. The viewer need only tune the receiver until neither of the light-emitting diodes is activated, at which point the viewer will know that the receiver is properly tuned (within a predetermined acceptable tuning range).

Although the embodiment described above has been illustrated as presenting a visual indication of mistuning by the activation of either of a pair of light-emitting diodes, many other visual methods of presenting an indication of mistuning are possible. For example, the outputs of the comparators may be applied to a logic gate whose output is coupled to a single light emissive element for activating that element only when the receiver is properly tuned. When the receiver is mistuned, the light emissive element will be off.

Other variations may include a tuning meter which may be calibrated to indicate proper tuning when the value of control voltage at lead 30 is at nominal and to indicate mistuning when the control voltage falls outside a predetermined range.

The major advantage of the fine tuning indicator described is that the synchronous detector can supply the control voltage for a visual tuning indicator in addition to demodulating the IF signal. Accordingly, the cost of implementing the fine tuning indicator is reduced.

Although the fine tuning indicator described has been illustrated in terms of a preferred embodiment, it will be obvious to those skilled in the art that many alterations and modifications may be made without departing from the spirit and scope of the invention. For example, many alternate visual indicators may be used to present an indication of receiver tuning in response to the control voltage developed by the synchronous detector. Tuning meters, one or more light-emitting diodes or lamps may be used and the reference voltages, if any, may be generated by any of many well-known circuits. Accordingly, all such modifications and alterations are deemed to be within the scope of the invention as defined by the appended claims.

What is claimed is:

1. In combination in a television receiver;
   a synchronous detector receiving a variable frequency input signal and generating a variable DC control voltage when locked to the frequency of the input signal, said control voltage having a predetermined value when the input signal is of a nominal frequency indicative of proper tuning of the receiver and having values which deviate from said predetermined value in accordance with deviations from the nominal frequency of the input signal; and
   indicating means responsive to said control voltage for generating a visual indication of the deviation of said control voltage from said predetermined value,
   whereby said indicating means provides a visual indication of the deviation from proper tuning of the television receiver.

2. The combination set forth in claim 1 wherein the input signal to said synchronous detector is the intermediate frequency television signal, including video components, and said synchronous detector has an output comprising demodulated video.

3. The combination set forth in claim 2 wherein said indicating means includes at least one light-emissive element adapted to be energized when said control signal deviates from said predetermined value by a predetermined amount.

4. The combination set forth in claim 3 wherein said indicating means includes means for generating first and second reference voltages whose values are, respectively, greater than and less than the predetermined value of said control voltage, and including means for actuating at least one visual indicator when said control voltage is greater than said first reference voltage and less than said second reference voltage.

5. The combination set forth in claim 4 wherein said actuating means includes a first comparator receiving said control voltage and said first reference voltage, and a second comparator receiving said control voltage and said second reference voltage, said first and second comparators generating outputs representative of said control voltage being greater than and less than said first and second reference voltages, respectively, and said comparator outputs being coupled to at least one visual indicator for actuation thereof.

6. The combination set forth in claim 5 wherein said means for generating said first and second reference voltages includes a resistive voltage divider coupled across a voltage potential, said voltage divider including first and second variable resistors each having a wiper arm adapted to receive from its variable resistor one of said first and second reference voltages.

7. In combination in a television receiver;
   a synchronous detector receiving an intermediate frequency television signal and generating a variable DC control voltage whose value deviates about a predetermined value in accordance with deviations from a nominal frequency of the intemediate frequency signal;
   means for generating first and second reference voltages whose values are, respectively, greater than and less than the predetermined value of said control voltage;
   means for comparing said first and second reference voltages to said control voltage and for generating a first indicating signal respresentative of said control voltage having a value between said first and second reference voltages and for generating a second indicating signal representative of said control voltage having a value outside said first and second reference voltages; and
   means responsive to said first and second indicating signals for generating a visual indication of the results of the comparison of said control voltage with said first and second reference voltages,
   whereby a visual indication is provided of the accuracy to which the television receiver is tuned.

8. The combination set forth in claim 7 wherein said means responsive to said first and second indicating signals includes at least one light-emissive element responsive to at least said second indicating signal for providing a luminance output when the value of said control voltage is outside the values of said first and second reference voltages.

* * * * *